United States Patent [19]

Matsumoto

[11] Patent Number: 5,293,944
[45] Date of Patent: Mar. 15, 1994

[54] METHOD OF AUTOMATICALLY CONTROLLING IMPACT RIPPER

[75] Inventor: Norihisa Matsumoto, Hirakata, Japan

[73] Assignee: Kabushiki Kaisha Komatsu Seisakusho, Tokyo, Japan

[21] Appl. No.: 867,197

[22] PCT Filed: Dec. 28, 1990

[86] PCT No.: PCT/JP90/01732

§ 371 Date: Jun. 26, 1992

§ 102(e) Date: Jun. 26, 1992

[87] PCT Pub. No.: WO91/10017

PCT Pub. Date: Jul. 11, 1991

[30] Foreign Application Priority Data

Dec. 28, 1989 [JP] Japan .................................. 1-341376

[51] Int. Cl.$^5$ .......................................... A01B 63/112
[52] U.S. Cl. ........................................ 172/2; 172/699;
37/904; 299/1.4; 299/1.05; 364/424.7;
364/431.07
[58] Field of Search ................ 172/2, 11, 12, 40, 699;
299/1.4, 1.05; 37/DIG. 18; 404/133.05, 117;
364/424.07, 431.07; 73/505; 171/9

[56] References Cited

U.S. PATENT DOCUMENTS

| | | | |
|---|---|---|---|
| 3,060,602 | 10/1962 | Buttenhoff | 172/2 X |
| 3,064,371 | 11/1962 | Kutzler | 172/2 X |
| 3,094,693 | 6/1963 | Taylor | 172/2 X |
| 4,031,964 | 6/1977 | Takahashi et al. | 172/12 X |
| 4,062,539 | 12/1977 | Tetsuka et al. | 172/12 X |
| 4,518,044 | 5/1985 | Wiegardt et al. | 364/424.07 X |

FOREIGN PATENT DOCUMENTS

| | | |
|---|---|---|
| 49-45361 | 12/1974 | Japan . |
| 61-24731 | 2/1986 | Japan . |
| 63-31160 | 2/1988 | Japan . |
| 63-31161 | 2/1988 | Japan . |

Primary Examiner—Randolph A. Reese
Assistant Examiner—Christopher J. Novosad
Attorney, Agent, or Firm—Richards, Medlock & Andrews

[57] ABSTRACT

An impact ripper (2) mounted on the rear portion of a construction machine, such as a bulldozer (1), for digging a hard soil layer is automatically controlled to reduce the operator's fatigue, to improve operability with regard to the posture of the impact ripper during operation of its vibrating mechanism (3), and to prevent breakdown of the impact ripper caused by wasteful striking. A vehicle tractive force and a vehicle speed required by digging resistance applied to a blade end (2a) of the impact ripper (2) are detected and signals obtained from the detections are inputted to a controller (4). When an automatic strike switch is on, an activating signal is outputted from the controller (4) to the vibrating mechanism (3) of the impact ripper (2) regardless of a vehicle body tractive force when a vehicle speed is less than a predetermined value. On the other hand, when the vehicle speed is equal to or grater than the predetermined value, an activating signal is outputted from the controller (4) only when the vehicle body tractive force is equal to or greater than a predetermined value.

20 Claims, 4 Drawing Sheets 5,293,944

METHOD OF AUTOMATICALLY CONTROLLING IMPACT RIPPER

TECHNICAL FIELD

The present invention relates to a method of automatically controlling an impact ripper mounted on the rear portion of a construction machine, such as a bulldozer, for digging a hard stratum, such as rock.

BACKGROUND ART

In conventional large bulldozers mainly used for digging, a blade device is mounted on a front portion thereof while a ripper device is mounted on a rear portion for digging or pushing soil. The ripper device used at a working site where the soil is mixed with hard rocks is mounted on a bracket fixed to the rear surface of a vehicle body through lifting and tilting hydraulic cylinders. The ripper device performs digging by inserting a blade thereof into the ground or by crushing the hard rock while changing the insertion angle. At a relatively soft ground, digging is performed by inserting the blade upright to the ground. At a hard rock ground, the operation of the ripper device is temporarily stopped and the rear portion of the body is floated. In that state, the hard rock is crushed utilizing the weight of the bulldozer and the pushing down force generated by a lifting cylinder of the ripper device. However, there is a limitation in the crushing of a hard rock, and crushing of the hard rock deteriorates the working efficiency. Hence, a ripper provided with a hydraulic breaker to crush hard rocks by giving a blow to it has been employed in recent years. Such a ripper is capable of crushing hard rocks which would be conventionally difficult to crush and can thus increase the digging efficiency.

However, at a working site where the aforementioned type of construction machine is used, the ground is generally composed of soft soils and hard rocks which are present in a mingled state, and the operator determines by intuition the digging condition and operates the bulldozer accordingly. That is, when the machine comes to a hard rock and the digging resistance is thereby increased, the operator crushes it by manually operating the vibrating mechanism of the impact ripper. When the digging resistance reduces, the operator stops the operation of the breaker. Such an operation dependent on the intuition of the operator requires the operator's skill and may generate wasteful striking of the ripper which may lead to breakage of the impact ripper. Thus, the working efficiency is deteriorated, and the operator often has fatigue.

In view of the aforementioned drawbacks of the conventional technique, an object of the present invention is to provide a method of automatically controlling an impact ripper which does not require the operator's skill, which is capable of reducing fatigue and of preventing breakage of the impact ripper caused by wasteful striking, which is capable of increasing the operability of the ripper during the operation of a breaker and which is capable of preventing an increase in the vibrations of a body during crushing of a rock bed.

SUMMARY OF INVENTION

In a method of automatic control over an impact ripper, a vehicle tractive force and a vehicle speed required by digging resistance applied to a blade end of the impact ripper are detected, and signals obtained from the detections are inputted to a controller. When an automatic strike switch is on, the controller outputs an activating signal to a vibrating mechanism of the impact ripper regardless of the vehicle body tractive force when the caterpillar speed is less than a predetermined value. On the other hand, when the caterpillar speed is equal to or greater than the predetermined value, an activating signal is outputted from the controller only when the vehicle body tractive force is equal to or greater than a predetermined value.

When a manual switch provided on the lever for the ripper is on, priority is given to manual operation, and the vibrating mechanism is controlled.

When the lever for the ripper is operated to tilt or lift the ripper, priority is given to a ripper posture operation, and the vibrating mechanism is turned off. When an amplitude of a bottom pressure of a lifting cylinder for the ripper is equal to or greater than a predetermined value and when that amplitude has occurred a predetermined number of times or more in sequence during crushing of a hard rock by the impact ripper, priority is given to the vehicle body vibration increase prevention operation, and the vibrating mechanism is stopped.

The method is capable of reducing the operator's fatigue, of improving operability in controlling the posture of the ripper during operation of a breaker, of preventing breakdown of the impact ripper caused by wasteful striking, and of preventing increase in vehicle body vibrations during crushing of a hard rock.

BEST MODE FOR CARRYING OUT THE INVENTION

A method of automatically controlling an impact ripper according to an embodiment of the present invention will be described below with reference to FIGS. 1 through 5.

Figure 1:
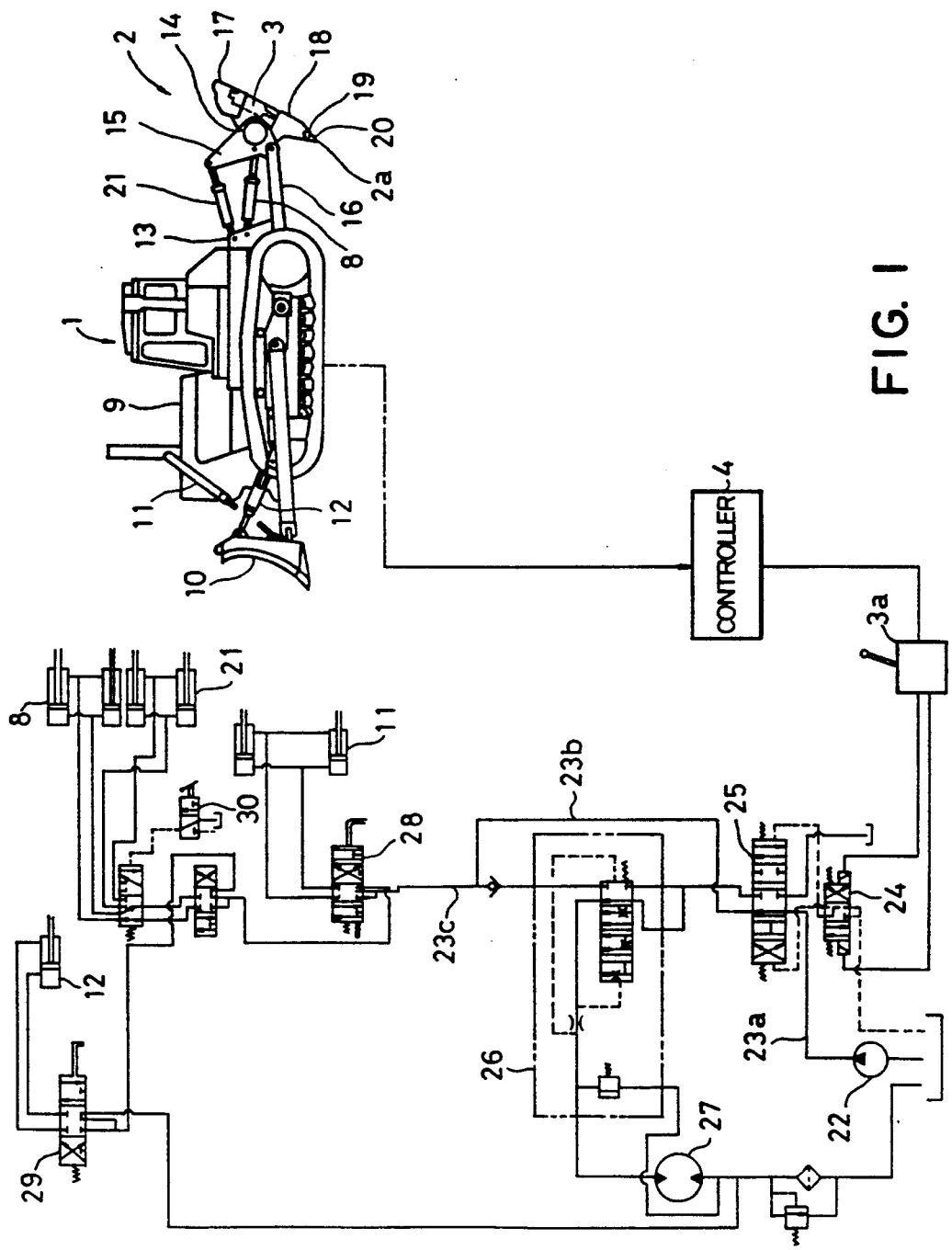
FIG. 1 illustrates an external view of a crawler vehicle according to an embodiment of the present invention and a hydraulic circuit thereof.

In a bulldozer 1 shown in FIG. 1, a blade 10 is mounted on the front portion of a body 9 by a lifting cylinder 11 and a tilting cylinder 12, and an impact ripper 2 is mounted on a bracket 13 fixed to the rear portion of the body 9.

The impact ripper 2 includes a cylindrical beam 14, a support member 15 mounted on each of the two ends of the cylindrical beam 14, a support link 16 coupled between the bracket 13 and the cylindrical beam 14, and an exciting mechanism (hereinafter referred to as a breaker) comprising a hydraulic breaker 3, a retaining member 17 mounted on the cylindrical beam 14 for supporting the breaker 3, a shank 18 pivotally supported by the supporting member 15, a digging blade 20 detachably mounted on the lower end of the shank 18 by a shaft pin 19, a lifting cylinder 8 for the impact ripper 2, and a tilting cylinder 21 used for changing the insertion angle of an included angle of the digging blade 20.

Digging, soil pushing and levelling of a relatively soft ground are performed using the blade 10 of the bulldozer 11. These works are called a blade work. Digging of a hard rock ground where the soil is mingled with hard rocks is performed using the impact ripper 2. This work is called a ripper work. In the ripper work, the insertion depth of an edge 2a is controlled by the lifting cylinder 8, while the insertion angle of the edge 2a is controlled by the tilting cylinder 21. Hard rock ground is crushed by operating the breaker 3 and thereby giving blows to the hard rocks.

In that case, in a hydraulic circuit of the working machine, such as the impact ripper 2, a hydraulic oil of a hydraulic pump 22 is supplied from a discharge circuit 23a to a vibration generating actuator 27 of the breaker 3 through an operating valve 25 for performing striking and stopping the striking of the hydraulic breaker 3 controlled by an electromagnetic pilot valve 24 and a flow rate control valve 26. When the breaker 3 is not in operation, the discharge oil of the hydraulic pump 22 is supplied to a blade lifting operating valve 28 via a bypass circuit 23b and a working machine circuit 23c, from which it is in turn supplied to both the blade lifting cylinder 11 and via a blade tilting operating valve 29 to the blade tilting cylinder 12. Concurrently with this, the discharge oil is supplied to both the lifting cylinder 8 for the ripper and the tilting cylinder 21 for the ripper via a ripper lifting/tilting operating valve 30. The breaker 3 is turned on and off by a switch 3a.

Figure 2:
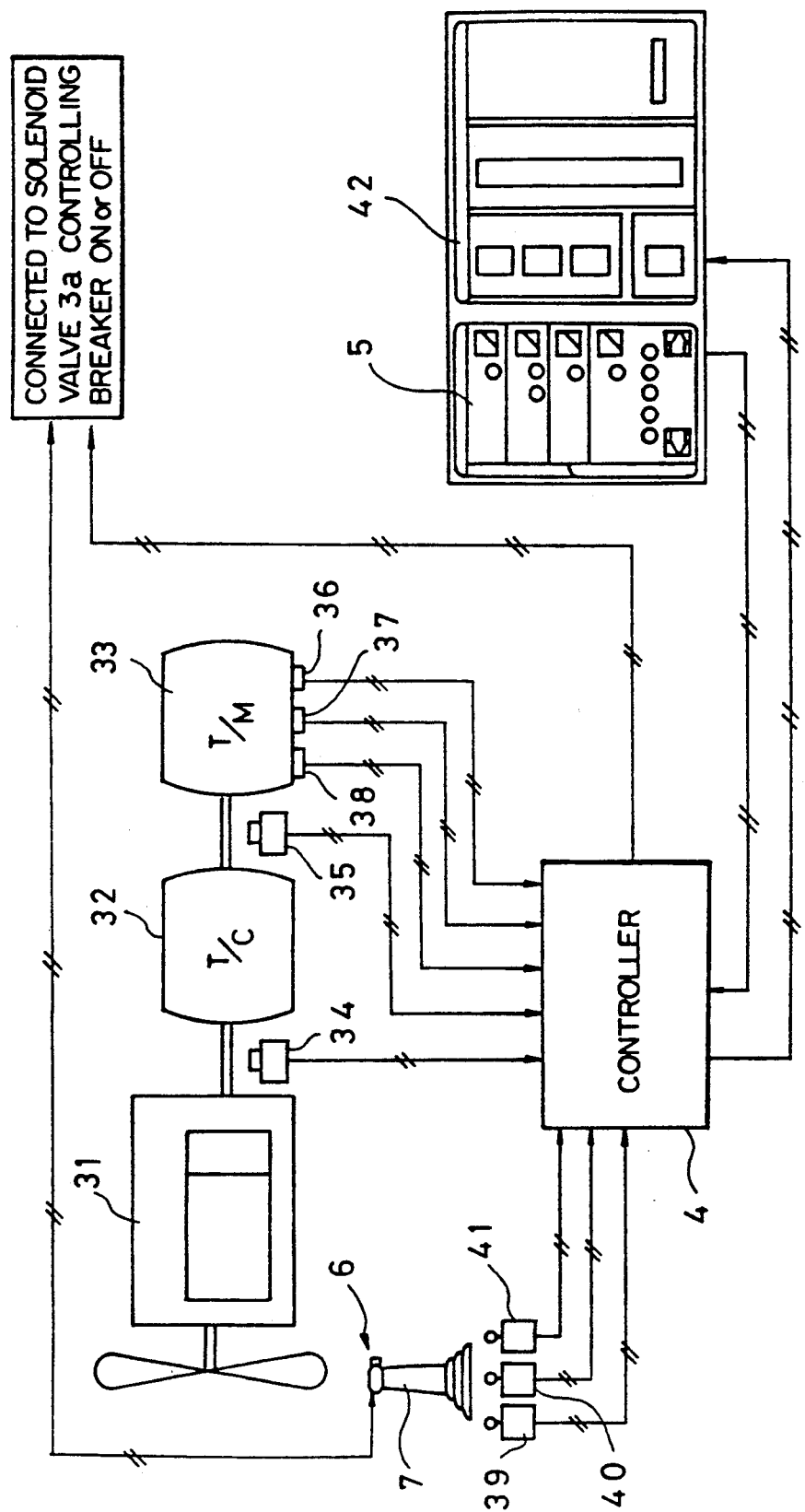
FIG. 2 is a basic electric circuit for automatic control according to the present invention.

FIG. 2 illustrates an engine 31 which is a power source of the bulldozer 1, a torque converter 32 coupled to the engine 31, a transmission 33 coupled to the torque converter 32 and so on. An engine speed sensor 34 is provided between the engine 31 and the torque converter 32, and a rotational speed sensor 35 for the torque converter 32 is provided between the torque converter 32 and the transmission 33. A tractive force P can be obtained from a difference between the rotational speed detected by the sensor 34 provided in advance of the torque converter 32 and the rotational speed detected by the sensor 35 provided beyond the torque converter 32.

Detection signals of a crawler vehicle speed (V km/H) sensor 36, an advance (F) clutch sensor 37, and a first speed (F1) clutch sensor 38 are inputted from the transmission 33 to a controller 4. Similarly, the detection values of the rotational speed sensors 34 and 35 are also inputted to the controller 4. At the lower end of a manually operated lever 7 for the ripper are provided three sensors 39, 40 and 41 for descent, ascent and tilting. Detection signals of these sensors are also inputted to the controller 4. A manual switch 6 is provided at an upper end of the lever 7 for the ripper. The manual switch 6 and the controller 4 are electrically connected to the solenoid valve 3a for turning on and off the breaker 3 so that the outputs thereof can be supplied thereto.

The controller 4 is also electrically connected to a control panel 42 provided with an automatic strike switch 5 and so on so that the output thereof can be displayed on the control panel 42.

Figure 3:
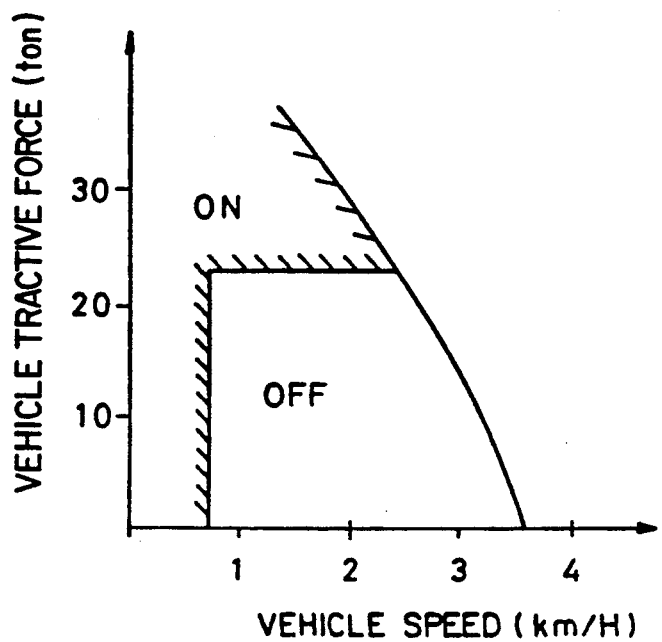
FIG. 3 is a graph illustrating the relation between a tractive force and a crawler vehicle speed according to the embodiment of the present invention.

FIG. 3 shows the relation between the tractive force and the crawler vehicle speed. In FIG. 3, ON and OFF indicate the regions where the breaker 3 is turned on or turned off, respectively. That is, when the digging blade is inserted into a hard rock, since no tractive force P exists, only the vehicle speed V is used for detection. In this embodiment, when that vehicle speed is 0.7 km/H, which is the speed immediately before a shoe strip occurs, or below, a strike is given to crush the rock by which the blade end 2a is caught regardless of the tractive force P. Also, when the tractive force P is 23 tons (one half of the weight of the body) or above, a strike can be given, i.e., the breaker 3 is turned on, regardless of the vehicle speed V. The breaker 3 is turned off in the region other than the abovedescribed region.

Figure 4:
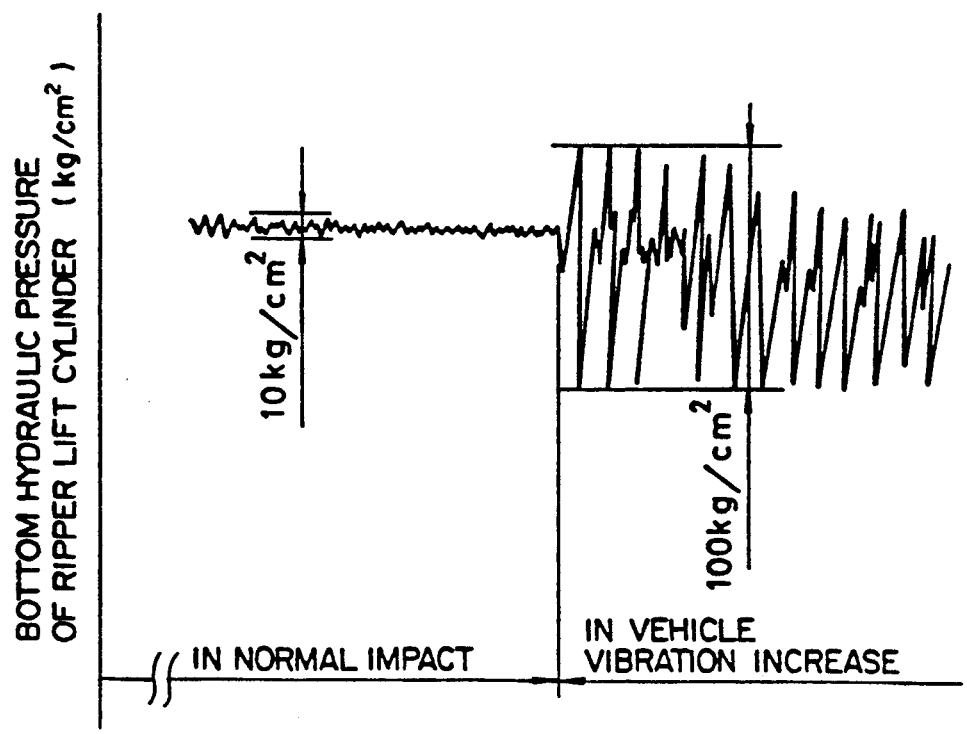
FIG. 4 is a graph illustrating the amplitude of a bottom pressure of a lifting cylinder during vibrations of the vehicle body.

FIG. 4 illustrates an example of a bottom pressure of the lifting cylinder 8 for the ripper which is generated when the vibrations of the vehicle body are large. When the strike given is normal, the hydraulic amplitude of the vehicle body vibrations is about 10 $kg/cm^2$. When the vibrations of the vehicle body are large, the difference between the maximum and minimum values is 100 $kg/cm^2$. Hence, when a hydraulic amplitude greater than 15 $kg/cm^2$ occurs consecutively five times or more, the operation of the breaker 3 is stopped to prevent damage to the impact ripper 2.

Figure 5:
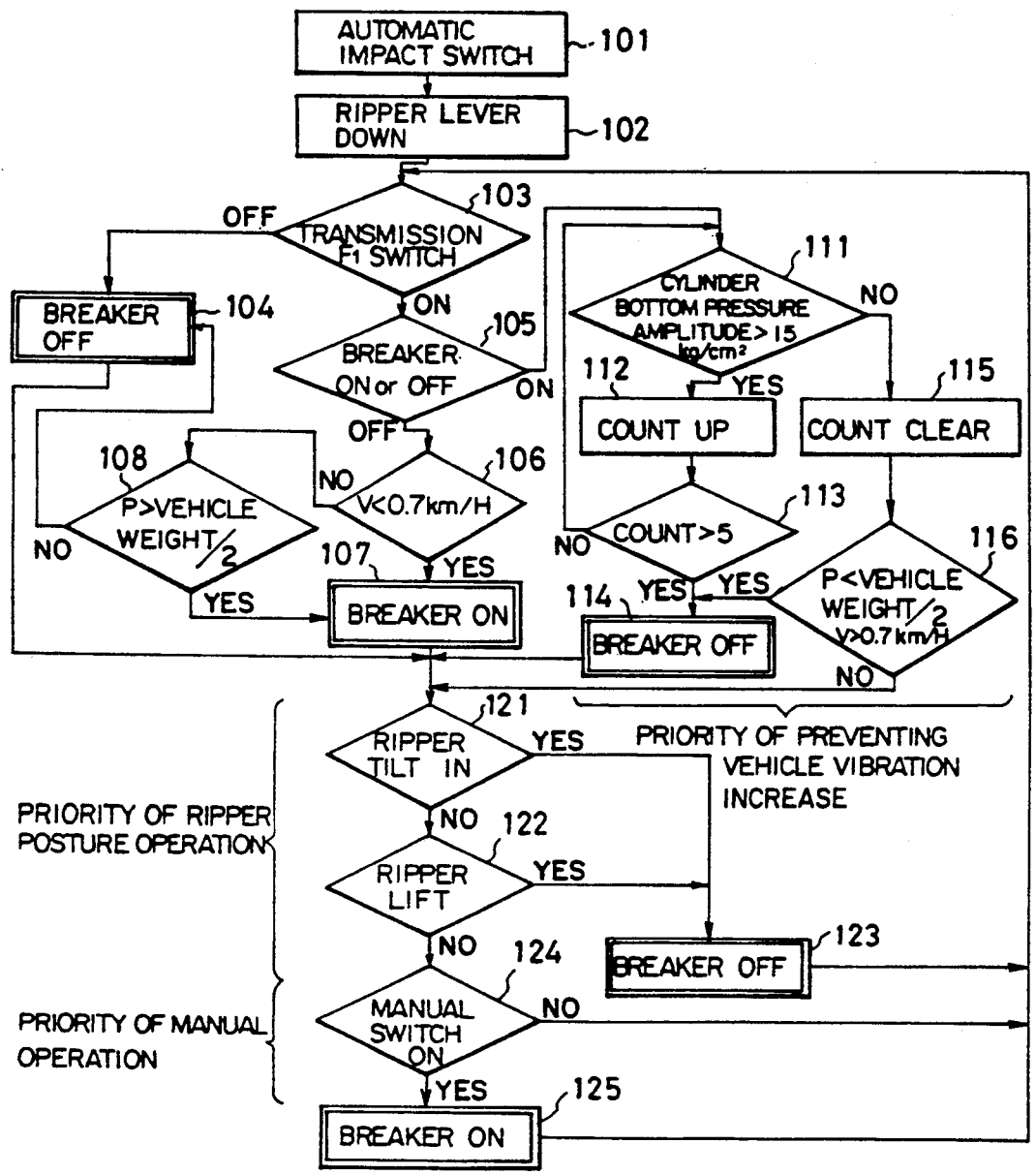
FIG. 5 is a flowchart of a method of automatic control of an impact ripper according to the embodiment of the present invention.

The method of automatically controlling the impact ripper according to the embodiment of the present invention will be described below with reference to FIGS. 2, 3 and 5.

First, when the automatic strike switch 5 is turned on in step 101, the lever 7 for the ripper is lowered in step 102. At that time, if it is determined in step 103 that the first speed switch (hereinafter referred to as an F1 switch) of the transmission 33 is off, the breaker 3 is turned off (step 104).

If it is determined in step 103 that the F1 switch is on, it is determined in step 105 whether the breaker 3 is operating. If the breaker 3 is not yet operating, it is determined whether the vehicle speed $V<0.7$ km/H (step 106). If the vehicle speed V is less than 0.7 km/H, the breaker 3 is turned on (step 107).

If it is determined in step 106 that the vehicle speed $V>0.7$ km/H, it is determined whether the tractive force $P>\frac{1}{2}$ of the vehicle body weight (step 108). If the tractive force $P>\frac{1}{2}$ of the vehicle body weight, the process goes to step 107 and the breaker 3 is turned on. However, if the tractive force $P<\frac{1}{2}$ of the vehicle body weight, the process goes to step 104 and the breaker 3 is turned off.

If it is determined in step 105 that the breaker 3 is operating, it is determined whether the hydraulic amplitude of the bottom pressure of the lifting cylinder 8 for the ripper when crushing is completed $>15$ $kg/cm^2$ (step 111). If the answer is affirmative, the number of times that amplitude has occurred is counted (step 112), and it is determined how many times counting has been made consecutively (step 113). If it is determined that the hydraulic amplitude of more than 15 $kg/cm^2$ has been counted five times or more in sequence, the breaker 3 is turned off (step 114).

If it is determined in step 113 that the hydraulic amplitude of more than 15 $kg/cm^2$ has been counted less than five times, the process returns to step 111, and it is determined whether the hydraulic amplitude of the bottom pressure of the lifting cylinder 8 for the ripper $>15$ $kg/cm^2$. Thereafter, the same process is repeated.

If it is determined in step 111 that the hydraulic amplitude $\leq15$ $kg/cm^2$, counting is cleared (step 115). Next, in step 116, the tractive force P and the vehicle speed V are evaluated. If the tractive force P<the vehicle body weight/2 and if the caterpillar speed V>0.7 km/H, the process proceeds to step 114 and the breaker 3 is turned off.

If the tractive force P>the vehicle body weight/2 or if the vehicle speed V<0.7 km/H, the process proceeds to step 121, and the operation of the breaker 3 continues.

However, if the lever 7 for the ripper is tilted (step 121) or if the lever 7 is lifted (step 122), since wasteful striking of the breaker 3 (the state in which the breaker 3 is not operated) is provided, the breaker 3 is turned off in either case in step 123, and the ripper posture operation proceeds. If it is determined in step 121 and step 122 that neither tilting nor ascending of the breaker 3 is being performed, the breaker 3 is turned on in step 125 and the operation of the breaker 3 continues. If the manual switch 6 is turned on in step 123, even if the breaker 3 is at a stop, the breaker 3 is turned on and the operation is started (step 125). If the manual switch 6 is turned off, when the breaker 3 is turned off, it continues stopped, and the process returns to step 103, and manual operation is prevented.

The numeric values employed in the present embodiment are illustrative and not restrictive, and numeric values suitable for various types of vehicle bodies can be employed.

As will be understood from the foregoing description in the present invention, it is possible to automatically perform control of the impact ripper in such a manner that the breaker is operated in an optimum vehicle body tractive force or vehicle speed range. Furthermore, the present invention is provided with the manual operation priority function, the ripper posture operation priority function and the vehicle body vibration increase prevention priority function.

INDUSTRIAL APPLICABILITY

In the impact ripper work of a construction machine, such as a bulldozer, for performing digging of a hard soil layer, such as a hard rock, the method of automatically controlling an impact ripper according to the present invention is capable of reducing the operator's fatigue, of improving operability in controlling the posture of the ripper during operation of a breaker, of preventing breakdown of the impact ripper caused by wasteful striking, and of preventing an increase in the vibrations of the vehicle body during crushing of a hard rock.

What is claimed is:

1. In a digging apparatus comprising a vehicle body, a drive train mounted on said vehicle body for producing vehicle body tractive force and a vehicle speed, an impact ripper mounted on said vehicle body, said impact ripper having an end for digging and a vibrating mechanism, and an operator's lever for controlling said impact ripper, the improvement comprising:
   a controller;
   means for producing a first signal and for applying said first signal to said controller, said first signal being representative of the vehicle body tractive force;
   means for producing a second signal and for applying said second signal to said controller, said second signal being representative of the vehicle speed;
   an automatic strike switch having an on position and an off position;
   whereby said controller includes means for providing an activating signal for said vibrating mechanism if said automatic strike switch is in its on position and said vehicle speed is less than a predetermined speed value, and wherein said controller includes means for providing an activating signal for said vibrating mechanism when said vehicle speed is at least as great as said predetermined speed value only if said automatic strike switch is in its on position and said vehicle body tractive force is at least as great as a predetermined tractive force value.

2. Apparatus in accordance with claim 1 wherein said vehicle body is a bulldozer having a front end and a rear end with a blade mounted on said front end, wherein said impact ripper is mounted on said rear end.

3. Apparatus in accordance with claim 1 wherein said drive train comprises an engine, a transmission, and a torque converter connected between said engine and said transmission; wherein said means for producing a first signal comprises a first sensor for determining the speed of said engine, a second sensor for determining the rotational speed output of said torque converter, and means for producing said first signal in response to the output of said first sensor and to the output of said second sensor.

4. Apparatus in accordance with claim 3 wherein said means for producing said second signal comprises a third sensor for determining the speed output of said transmission.

5. Apparatus in accordance with claim 4 further comprising an advance clutch sensor and a first speed sensor connected to said transmission for providing signals to said controller.

6. Apparatus in accordance with claim 5 further comprising a hydraulic lifting cylinder for providing a ripper posture operation by raising or lowering said impact ripper and a hydraulic tilting cylinder for providing a ripper posture operation by tilting said impact ripper; wherein said operator's lever is provided with a descent sensor, an ascent sensor, and a tilting sensor, with the output of each of said descent sensor, said ascent sensor and said tilting sensor being connected to said controller, whereby the providing of an activating signal from said controller to said vibrating mechanism is interrupted when one of said ascent sensor and said tilting sensor indicates a ripper posture operation.

7. Apparatus in accordance with claim 6 further comprising a manual operation switch for activating said vibrating mechanism when said manual operation switch is in its on position even if the output of said controller would have the impact ripper at a stop.

8. Apparatus in accordance with claim 6 further comprising a sensor for determining the amplitude of the pressure of said hydraulic lifting cylinder when said impact ripper gives a strike, whereby said controller turns said impact ripper off when said amplitude exceeds a predetermined amplitude value consecutively for a predetermined number of times.

9. Apparatus in accordance with claim 1 further comprising a hydraulic lifting cylinder for providing a ripper posture operation by raising or lowering said impact ripper and a hydraulic tilting cylinder for providing a ripper posture operation by tilting said impact ripper; wherein said operator's lever is provided with a descent sensor, an ascent sensor, and a tilting sensor, with the output of each of said descent sensor, said ascent sensor and said tilting sensor being connected to said controller, whereby the providing of an activating signal from said controller to said vibrating mechanism is interrupted when one of said ascent sensor and said tilting sensor indicates a tripper posture operation.

10. Apparatus in accordance with claim 9 further comprising a manual operation switch for activating said vibrating mechanism when said manual operation switch is in its on position even if the output of said controller would have the impact ripper at a stop.

11. Apparatus in accordance with claim 9 further comprising a sensor for determining the amplitude of the pressure of said hydraulic lifting cylinder when said impact ripper gives a strike, whereby said controller turns said impact ripper off when said amplitude exceeds a predetermined amplitude value consecutively for a predetermined number of strikes.

12. A method of automatically controlling an impact ripper which is mounted on a vehicle body; wherein said impact ripper has a vibrating mechanism; wherein said vehicle body is provided with an engine, for producing vehicle body tractive force and a vehicle speed, an operator's lever, and an automatic strike switch having an on position and an off position; said method comprising:
 determining the vehicle body tractive force;
 determining the vehicle speed;
 providing an activating signal for said vibrating mechanism if said automatic strike switch is in its on position and said vehicle speed is less than a predetermined speed value; and
 providing an activating signal for said vibrating mechanism when said vehicle speed is at least as great as said predetermined speed value only if said automatic strike switch is in its on position and said vehicle body tractive force is at least as great as a predetermined tractive force value.

13. A method in accordance with claim 12 further comprising determining the position of said operator's lever, and stopping any operation of said vibrating mechanism when the position of said operator's lever indicates a ripper posture operation is desired.

14. A method in accordance with claim 12 wherein said vehicle body is provided with a manual operation switch, further comprising activating said vibrating mechanism when said manual operation switch is in its on position even if the impact ripper is at a stop.

15. A method in accordance with claim 12 wherein a hydraulic lifting cylinder is provided to lift said impact ripper, further comprising determining the amplitude of the pressure of said hydraulic lifting cylinder when said impact ripper gives a strike, and turning said impact ripper off when said amplitude exceeds a predetermined amplitude value consecutively for a predetermined number of strikes.

16. In a method of automatically controlling an impact ripper by an operation of a lever for the impact ripper, wherein the impact ripper has a blade end, is mounted on a rear portion of a body of a vehicle, and has a vibrating mechanism, and wherein said vehicle is driven by a drive train composed of an engine, a torque converter, and a transmission, the engine having a rotational output connected to an input of the torque converter, and the torque converter having a rotational output connected to said transmission;
 the improvement comprising:
 detecting the rotational speed of the rotational output of said engine and establishing a first signal representative thereof;
 detecting the rotational speed of the rotational output of said torque converter and establishing a second signal representative thereof;
 inputting said first and second signals to a controller to determine a vehicle body tractive force required by digging resistance applied to said blade end of said impact ripper;
 determining the vehicle speed and establishing a third signal representative of the thus determined vehicle speed;
 inputting said third signal to said controller; and
 when the thus determined vehicle speed is less than a predetermined value and an automatic strike switch is on, outputting an activating signal from said controller to said vibrating mechanism of said impact ripper regardless of the vehicle body tractive force; and
 when the thus determined vehicle speed is at least equal to said predetermined value and said automatic strike switch is on, outputting an activating signal from said controller to said vibrating mechanism only when the vehicle body tractive force is at least equal to a predetermined value.

17. A method of automatically controlling an impact ripper according to claim 16, further comprising:
 when a manual switch provided on said lever for the impact ripper is on, giving priority to manual operation and, if said vibrating mechanism is at a stop, starting the operation of said vibrating mechanism.

18. A method of automatically controlling an impact ripper according to claim 16, further comprising:
 when said lever for the impact ripper is operated to tilt or ascend the impact ripper, giving priority to a ripper posture operation and stopping said vibrating mechanism.

19. A method of automatically controlling an impact ripper according to claim 16, further comprising:
 when an amplitude of a bottom pressure of a lifting cylinder for the impact ripper, which is equal to or greater than a predetermined value, has occurred at least a predetermined number of times in sequence during crushing of a hard rock by said impact ripper, giving priority to a vehicle body vibration increase prevention and stopping said vibrating mechanism.

20. A method of automatically controlling an impact ripper according to claim 16, further comprising:
 when a manual switch provided on said lever for the impact ripper is on, giving priority to manual operation and manually controlling said vibrating mechanism,
 stopping said vibrating mechanism when said lever for the impact ripper is operated to tilt or ascend the impact ripper, and
 stopping said vibrating mechanism when an amplitude of a bottom pressure of a lifting cylinder for the impact ripper, which is at least equal to a predetermined value, has occurred at least a predetermined number of times in sequence during crushing of a hard rock by said impact ripper.

* * * * *

UNITED STATES PATENT AND TRADEMARK OFFICE
CERTIFICATE OF CORRECTION

PATENT NO. : 5,293,944
DATED : March 15, 1994
INVENTOR(S) : Norihisa MATSUMOTO

It is certified that error appears in the above-indentified patent and that said Letters Patent is hereby corrected as shown below:

```
Column 6, line 68, delete "tripper" and insert
     --ripper--.
```

Signed and Sealed this

Sixth Day of September, 1994

Attest:

BRUCE LEHMAN

Attesting Officer     Commissioner of Patents and Trademarks